Oct. 24, 1944.   W. J. MILLER   2,361,312
APPARATUS FOR FINISHING PREFABRICATED POTTERY APPENDAGES
Original Filed Feb. 5, 1941    2 Sheets-Sheet 1
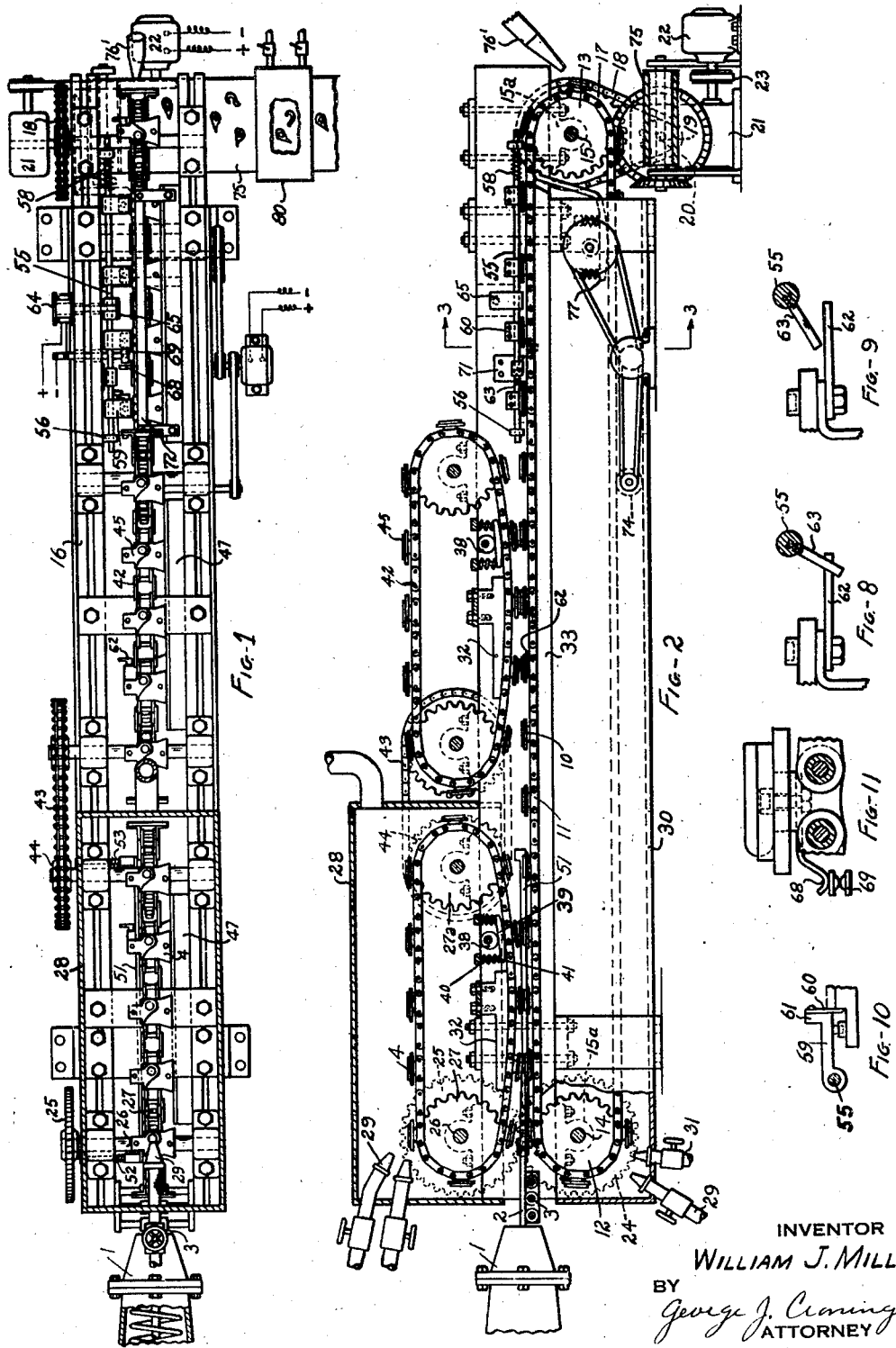
INVENTOR
WILLIAM J. MILLER
BY
George J. Craninger
ATTORNEY Oct. 24, 1944.   W. J. MILLER   2,361,312
APPARATUS FOR FINISHING PREFABRICATED POTTERY APPENDAGES
Original Filed Feb. 5, 1941   2 Sheets-Sheet 2
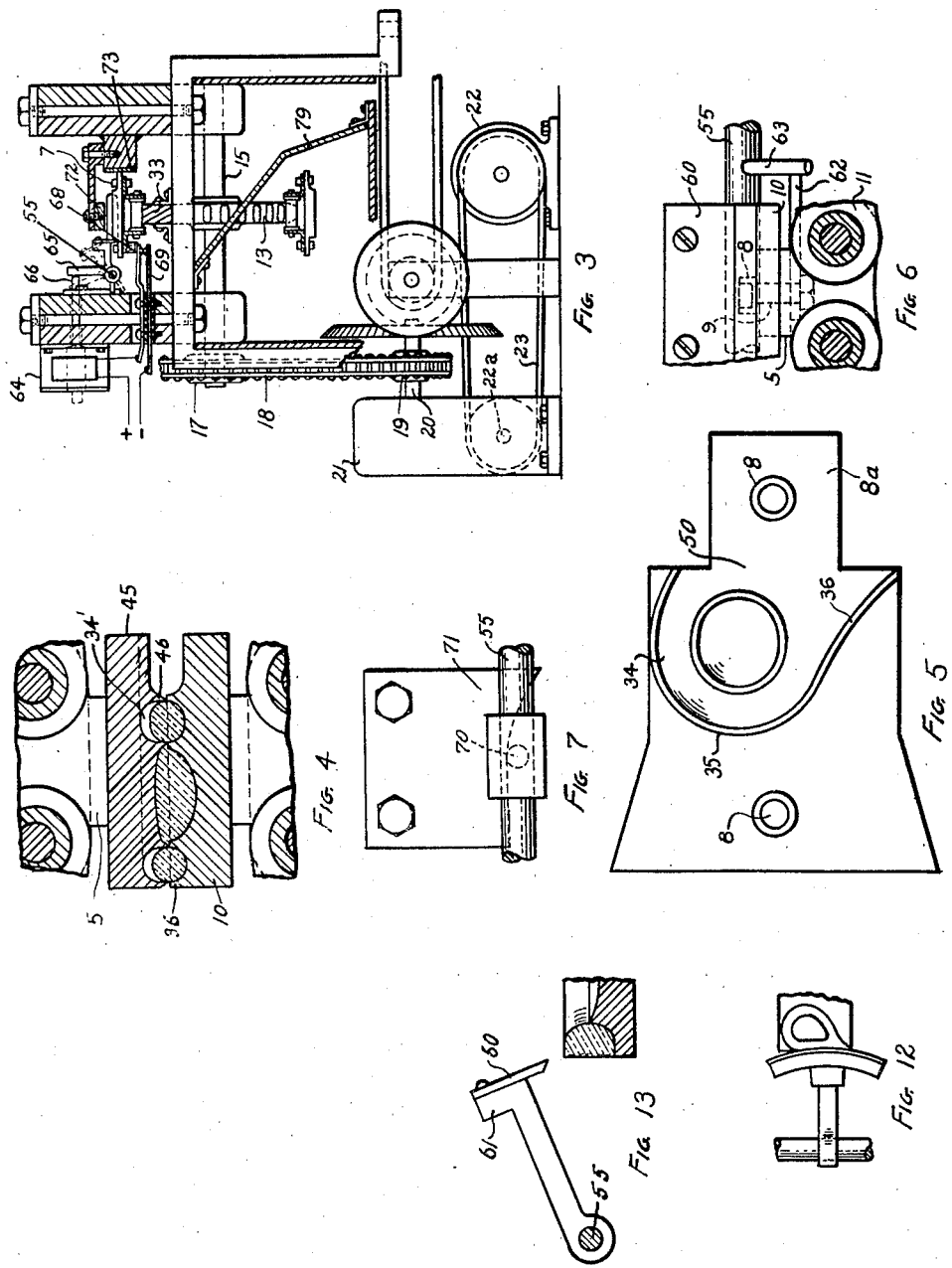
INVENTOR.
WILLIAM J. MILLER
BY
George J. Cleninger
ATTORNEY Patented Oct. 24, 1944

2,361,312

UNITED STATES PATENT OFFICE 2,361,312

APPARATUS FOR FINISHING PREFABRICATED POTTERY APPENDAGES

William J. Miller, Swissvale, Pa.

Original application February 5, 1941, Serial No. 377,476. Divided and this application June 24, 1943, Serial No. 492,010

16 Claims. (Cl. 25—107)

This is a division of my co-pending application, Serial No. 377,476, filed February 5, 1941.

This invention relates to methods and apparatus for manufacturing pottery appendages; such as cup handles and the like from plastic ceramic materials.

It has to do with methods and apparatus for the mass production of appendages in one or more shapes from clay mass to completed article ready for attachment to preformed pottery ware. The improvements are particularly adapted for use in connection with mass-producing pottery ware forming machinery; such as, that shown and described in my United States Patent No. 2,046,525. The present invention has to do with operations occurring subsequent to the formation of the appendages whereby the appendage is made ready for attachment to the ware and dressed.

In the drawings:

Fig. 1 is a top plan view of the preferred form of apparatus for manufacturing appendages.

Fig. 2 is a side elevation of the apparatus shown in Fig. 1.

Fig. 3 is a vertical section through the trimming station.

Fig. 4 is an enlarged vertical section through the device for trimming fins.

Fig. 5 is a top plan view of one of the appendage mold sections.

Fig. 6 is a detail showing a gang trimmer and certain of the operating parts therefor.

Fig. 7 is a detail of a cam arrangement for rotating the trimmer bar.

Figs. 8 and 9 illustrate two positions of operation of controls shown in Fig. 6.

Fig. 10 is a detail of one of the trimmers.

Fig. 11 is a detail of an electrical control.

Fig. 12 is a detail showing how the appendage terminal portion is trimmed to fit the article vertically.

Fig. 13 is a detail showing how the terminal portion of the appendage is trimmed to fit the article circumferentially.

In Figs. 1, 2, 3 and 6, 1 designates a pug mill having an extrusion orifice capable of forming a ribbon of clay 2 which is received on rollers 3 and progressed by the force of extrusion between cooperable pairs of partible appendage forming molds. The upper mold sections 4 are attached to the apertured bent lug side plates 5 of endless roller chain 6 by bolts. The ends of said bolts are unthreaded and serve as indexing pins for centering and aligning the mold sections when in cooperative relation. They project into the hollow heads 8 on bolts 9 holding the lower mold sections 10 on endless roller chain 11.

Roller chain 11 is mounted on sprockets 12 and 13 on shafts 14 and 15 respectively journaled in bearings 15a in frame 16 and has a substantially horizontal course running on track 33. Shaft 15 is rotated by sprocket 17 and chain 18, Figs. 2 and 3, and sprocket 19 on power shaft 20 of variable speed transmission 21. Motor 22 is connected to the power shaft 22a of transmission 21 by belt 23. Gear 24 on shaft 14, Fig. 2, drives gear 25 on shaft 26 to thereby synchronically drive chain 6 on sprockets 27 and 27a with chain 11.

Upper chain 6 operates in a housing 28 having adjustable valved nozzles 29 preferably representing burners for heating the mold sections 4. Said mold sections are preferably operated at a temperature which will render same non-adhesive to the plastic ceramic material. If operated at a temperature sufficient to vaporize some of the liquid constituents of the plastic ceramic material, the steam thus generated will tend to repel the plastic material from the mold and will also tend to solidify or harden the outer surface. The lower chain 11 also operates in a housing 30 provided with nozzles 29 and 31 for the same purpose as explained in connection with housing 28. It will be understood that the nozzles 29 may be used for heating and/or spraying liquid such as oil or other substances onto the molding surfaces of the molds for various purposes including the release of the appendage or the conditioning of the mold for the reception of the appendage.

32 is an elongated thrust shoe adjustably secured to the frame 16, having a tapered chain engaging surface, Fig. 2, superimposed relative to the lower course of chain 6. The purpose of this device is to guide the mold sections 4 and 10 into firm closing engagement.

In Fig. 2, the upper course of the chain 11 is shown as substantially tangent to the arc of travel of the lower course of chain 6 as the molds approach and leave the forming position.

With reference to Fig. 5, each mold section comprises a body portion having one-half of an appendage forming cavity 34 with a marginal ridge 35 surrounding the cavity. In both the lower and upper mold sections, the top of the ridge is preferably flat as at 36. Holes 8 receive the bolts for attaching the mold sections to their respective chains. The upper ridge may be sharp like a knife edge to effect a trimming operation incident to molding if desired as more fully explained in my co-pending application supra.

Cam 38 vibrates bar 39 engaging the lower course of chain 6 to insure release of the appendage to the lower mold section. The bar is suspended from the frame 16 by tension springs 41 and held in alignment by guide rods 49.

The mold sections when in cooperative relation normally would have an open side representing the zone of the terminal or attaching face of the appendage, see zone 50, Fig. 5. In order to cap this normally open side of the mold during the molding operation, a closure 51 in the form of an elongated bar, Fig. 2 is provided. Said bar is horizontally disposed between the opposed courses of upper and lower chains 6 and 11. The mold sections close on said bar with the side surface of the bar intimately engaging the mold sections and closing the gap. The closure bar 51 is supported from the frame 16 by means of laterally extending horizontally adjustable thrust rods 52 having thrust springs 53 thereon. As the mold sections come together, they tend to close upon the bar and ride along the same. While the material isolated in the molding cavity is normally prevented from escaping, it is desired that excess clay be permitted to extrude under pre-determined back pressure and such pressure will be determined by the resistance afforded by springs 53. The bar also tends to compact the terminal portions or portion of the appendage so they may be cut and trimmed more easily. The length of said bar is preferably only sufficient to engage the material whilst the gap is being closed and during the critical molding period. 47 is an horizontal guide and thrust rail for counteracting the thrust of bar 51.

After the appendage has been formed and released to the lower mold sections 10, said appendage is transported therein to means for removing excess clay such as fins and the like normally occurring along the line of juncture of the mold. This operation I shall designate as "fettling" and the means a "fettler." Said device comprises an endless chain 42 driven by chain 43 and sprocket 44 synchronically with chain 6. Fettling devices 45 are attached to chain 42 in evenly spaced relation on centers corresponding to center to center spacing between molds 10. Said fettling devices 45, Fig. 4, have an arched appendage receiving cavity 34, surrounded by a knife edge 46 which cooperates with the flat upper surface 36 of the lower mold ridge in trimming off fins which may result from molding. The chain 42 and mechanism associated therewith is substantially the same as chain 6, there being a thrust shoe 32 and a vibrator cam 38 for purposes previously described. The fettling tools 45 may be heated if desired or treated in various ways to render the same non-adhesive. It will be noted that the bar 51 is eliminated because there is no extruding pressure applied to the appendage during this operation and therefore no need to restrict the ceramic material.

After the appendages have been fettled, they are transported in mold sections 10, Figs. 1 and 2, to a trimming device for cutting the attaching surface of the terminal or terminals of each appendage to proper contour to fit the surface of the ware to which the appendage is to be attached. Said trimmer preferably comprises a group of blade holders having the same or different blades attatched thereto located in spaced relation on shaft 55.

Since the present apparatus may produce appendages of the same or different shape and design, this invention comprehends the manufacture of appendages of different designs in consecutive order or in groups of any desired number. Therefore, the trimmers will be arranged to correspond with the requirements of the appendage upon which each individual trimmer is to operate. Thus, the trimmers may be all alike or they may have different trimming and cutting characteristics.

Said trimmer includes a slidable and rotatable shaft 55 supported in bearings 56 attached to frame 16 at one side of the upper horizontal course of chain 10. Mounted in spaced relation along shaft 55 are several blade holders 59, the spacing being equal to the center to center spacing of the mold sections 10. Each blade holder has a trimming blade 60 detachably fastened to the head 61.

The axis of shaft 55 is parallel to the line of joinder of the mold sections 4 and 10. The holders 59 project laterally relatively to the chain 10 and are fastened securely to the shaft 55 for rotational and sliding movement therewith. In idle position, said holders and blades are raised as shown in Fig. 17, in order not to interfere with the molds which may move into the trimming zone therebelow.

Fastened to chain 11 at spaced intervals are dogs 62, Fig. 8 adapted to engage an arm 63 secured to shaft 55 normally projecting into the path of travel of the dogs 62 when the shaft is in full retracted position, Fig. 2. A compression and torsion spring 58, Fig. 1, normally urges the shaft to the left. After a pre-determined number of mold sections 10 carrying fettled appendages have entered the trimming zone, a dog 62 engages the arm 63 thereby propelling the shaft 55 to the right at the same speed of travel as the chain.

In the lengthwise center of shaft 55, Fig. 1, is secured a vertical thrust plate 65 positioned so as to be engaged by a thrust rod 66 secured to the core of a stationary solenoid 64 fastened to frame 16. As shaft 55 is shifted to the right, a cam 68, Fig. 13, closes switch 69 thereby energizing a solenoid 64 and causing thrust rod 66 to rotate shaft 55. This action depresses the gang of trimmers thereby trimming the attaching faces of the appendage terminal or terminals on a radius.

The cutting edge of the blades transcribe an arc having a radius substantially equal to the distance between the axis of the article to which the appendage is to be attached and the outside circumference of the body. Thus, the terminals of the appendage are cut exactly to shape to match the circumference of the article. It might be mentioned in passing that the diameters of commercial articles is more or less standardized and it would therefore be most practical in operating the present apparatus to standardize to as great an extent as possible on the production selected for any particular run.

During the aforesaid operations, the shaft 55 is in continuous longitudinal sliding motion, and switch 69 remains closed only for a short interval. When switch 69 is opened, shaft 55 is rotated to thereby raise the tirmmers by a cam 71 which turns pin 70, Fig. 7, thereby rotating shaft 55 in a clockwise direction. This action raises pin 63, see Figs. 10 and 11, out of engagement with dog 62 thereby permitting spring 58 to snap shaft 55 to the left to original position. Spring 58 is designed to provide sufficient torsion to rotate shaft 55 in a counter-clockwise direction once the arm 63 has cleared the dog 62 to return the arm 63 to a position where it may be engaged by the next dog 62 in succession.

An overhead bar 72 extending the length of the trimming zone and positioned close to the upper surface of the appendage and close to the knife or blade is provided to prevent lifting of the appendage in case the blade adheres to and tends to pull the appendage out of the molding cavity on the up stroke. In order to accurately position the molds during the trimming, I provide a bar 73 supported by the frame 16 which engages one side of the mold, preferably the side opposite the trimming members. Said bar is located on the longitudinal center line of the molds which tend to "ride" the same during the trimming operation.

Fig. 12 shows one of the many shapes the trimmer may take. In this instance, the trimmer is of arcuate form in order to show the lengthwise curvature of the attaching portion of the appendage. The terminals of the handle must not only be fit circumferentially to the surface of the article for which they are made, but they must fit any heightwise curvature as, for example, a straight walled coffee or bell mounted teacup. Therefore, there may be many variations in the exact shape and contour of the terminals and their relative positions, however, it is within the scope of this invention to provide a trimmer and to operate the trimmer in such fashion as to produce the desired contour and radius on the attaching surface or surfaces of the appendage. It will be understood that I am not limited to the exact shape or design of trimmer disclosed or to the motion of the trimmer bar described and illustrated.

After the appendages have been molded, fettled and trimmed as aforesaid, the mold sections 10 are inverted over a conveyor belt 75 as the chain 11 passes over sprocket 13. The appendages are preferably removed by gravity but in case the appendage sticks, then air jets 76' may be employed to help dislodge the appendage or the mold may be vibrated by motor-driven vibrators 77. After the mold is emptied, it passes into the housing 30 where it may be further vibrated to thoroughly clean the same and, if desired, said molds may be passed over brushes 74, air jets and the like to thoroughly clean the same. The scrap may fall into a chute or onto a belt conveyor (not shown), Fig. 3, for carrying scrap to the outside.

It is preferred to condition the appendages before they are attached to the article of ware and to do any other such operations as sponging after appendage has been removed from the mold. If desired, the belt conveyor may travel directly into a conditioning chamber 80 equipped with air-conditioning means whereby the appendage may be brought to a physical condition compatible to that of the ware. The length of this chamber and the length of time the appendage is exposed to a conditioning atmosphere will depend upon the character of the clay from which the appendage is being made and the amount of conditioning required. After the appendage has been matured, it is attached to the article for which it is made and this is accomplished by dipping the terminal portion of the appendage in slip and sticking it mechanically or manually to the article.

Having thus described my invention, what I claim is:

1. Apparatus for finishing prefabricated potteryware appendages having a travelling appendage support, and means arranged to travel therewith for removing material from the terminal portion of the appendage whilst in motion.

2. Apparatus for finishing prefabricated potteryware appendages having a travelling appendage support, means arranged to travel with the support for detaching material from the body of the appendage and means for relatively moving the two to effect the material detaching operation.

3. Apparatus for finishing prefabricated potteryware appendages having a travelling appendage support, a terminal trimmer arranged to travel therewith and means for actuating said trimmer whilst the two are in motion to impart a given contour to the attaching face of the appendage terminal.

4. Apparatus for finishing prefabricated pottery appendages having a travelling appendage support, a fin trimmer arranged to travel therewith and means for moving the trimmer and support into cooperative trimming relation.

5. Apparatus for finishing prefabricated pottery appendages having a travelling appendage support, a travelling fin trimmer, a travelling terminal trimmer and means for cooperating said trimmers with the appendage whilst the appendage is travelling to trim off the fins and contour the attaching face of the appendage terminal respectively.

6. Apparatus for finishing prefabricated pottery appendages having a travelling appendage support and means movable relative to the support for fettling and trimming the appendage arranged to travel therewith.

7. Apparatus for finishing prefabricated potteryware appendages comprising, in combination, a travelling appendage support, means for fettling the edge of the appendage arranged to travel with the support, and means intermittently movable with the support at another position for trimming the terminal portion of the appendage.

8. Apparatus for finishing prefabricated potteryware appendages comprising, in combination, a travelling appendage support, means arranged to travel with the appendage for fettling and trimming around the outside and the terminal of the appendage, and means for receiving finished appendages and conveying them to an attaching position there being means associated with said last named conveyor for maturing said appendages.

9. Apparatus for finishing prefabricated appendages comprising a support for carrying appendages through a finishing zone, means for finishing appendages in said zone and means for moving said finishing means relative to said support to effect the finishing of appendage.

10. Apparatus for finishing prefabricated appendages comprising a support for carrying appendages through a finishing zone, means for moving said support, means for finishing appendages arranged above the line of travel of said support, and means for relatively moving the finishing means and support to effect the finishing of the appendage.

11. Apparatus for finishing prefabricated appendages comprising an appendage support, a cutter supporting means rotatable about a given axis and movable therealong, a cutter supported by said cutter support, means for moving said cutter support along the axis in one direction, means for reversing the direction of travel thereof along the axis and means for rotating said cutter support about said axis.

12. Apparatus for finishing prefabricated appendages comprising a support for receiving the appendage, a cutter supporting means arranged to rotate about and shift along a given axis, a cutter supported thereby, means for moving the support along the axis and means for rotating the cutter support about the axis.

13. Apparatus for finishing prefabricated appendages comprising a support for receiving the appendage, a cutter supporting means, a cutter supported thereby and electro-magnetic means for moving said cutter supporting means relative to said appendage support.

14. Apparatus for finishing prefabricated appendages comprising a support for carrying appendages through a finishing zone, means for moving said support, a fettler and a terminal trimmer arranged above the line of travel of said support and means for moving said fettler and terminal trimmer relative to said support to effect the finishing of the appendage.

15. Apparatus for finishing prefabricated appendages comprising a support for receiving the appendage, a cutter arranged thereabove, and means for moving the appendage support and cutter along converging paths to cooperate the cutter with the work and along diverging paths to separate the cutter from the work.

16. Apparatus for finishing prefabricated appendages comprising a support for receiving the appendage, a cutter, means for moving the appendage support and cutter along parallel paths and means for moving the cutter relative to the support whilst moving in said parallel paths to effect a trimming operation.

WILLIAM J. MILLER.